United States Patent [19]
Takashima et al.

[11] Patent Number: 6,097,843
[45] Date of Patent: Aug. 1, 2000

[54] COMPRESSION ENCODING APPARATUS, ENCODING METHOD, DECODING APPARATUS, AND DECODING METHOD

[75] Inventors: Masatoshi Takashima, Tokyo; Mitsuaki Shiraga, Chiba, both of Japan

[73] Assignee: Sony Corporation, Japan

[21] Appl. No.: 09/010,613

[22] Filed: Jan. 22, 1998

[30] Foreign Application Priority Data

Jan. 27, 1997 [JP] Japan .................................. 9-012333

[51] Int. Cl.[7] ........................................................ G06K 9/36
[52] U.S. Cl. ............................................. 382/232; 382/236
[58] Field of Search ........................................ 382/232, 236, 382/239, 238, 249; 358/136, 135, 133, 105, 426; 348/415, 416, 403, 407, 413

[56] References Cited

U.S. PATENT DOCUMENTS

| | | | |
|---|---|---|---|
| 5,249,048 | 9/1993 | Sugiyama | 358/136 |
| 5,253,078 | 10/1993 | Balkanski et al. | 358/426 |
| 5,418,569 | 5/1995 | Ando | 348/405 |
| 5,428,693 | 6/1995 | Murakami et al. | 382/232 |
| 5,497,435 | 3/1996 | Berger | 382/249 |
| 5,598,483 | 1/1997 | Purcell et al. | 382/232 |

*Primary Examiner*—Jose L. Couso
*Assistant Examiner*—Duy M. Dang
*Attorney, Agent, or Firm*—Lerner, David, Littenberg, Krumholz & Mentlik, LLP

[57] ABSTRACT

In an encoder as a compression encoding apparatus for compression encoding an inputted image signal in accordance with a rule of the MPEG or the like, other compression and decompression different from a main compression encoding which is executed by a motion detection/compensation processing circuit, a discrete cosine transforming/quantizing circuit, and a Huffman encoding circuit are executed. The compression and decompression are executed by a signal compressing circuit and a signal decompressing circuit. As mentioned above, by reducing an amount of information that is written into a memory provided in association with the compression encoding apparatus, a capacity of the memory can be decreased. By executing other compression and decompression different from a decoding process corresponding to the compression encoding to a decoding apparatus according to the rule of the MPEG or the like, a capacity of a memory provided in association with the decoding apparatus can be reduced.

32 Claims, 14 Drawing Sheets

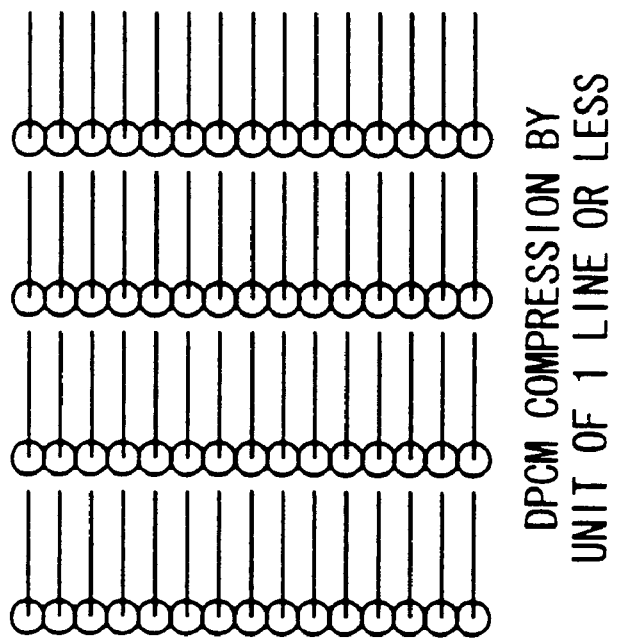
Fig. 9
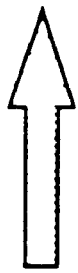
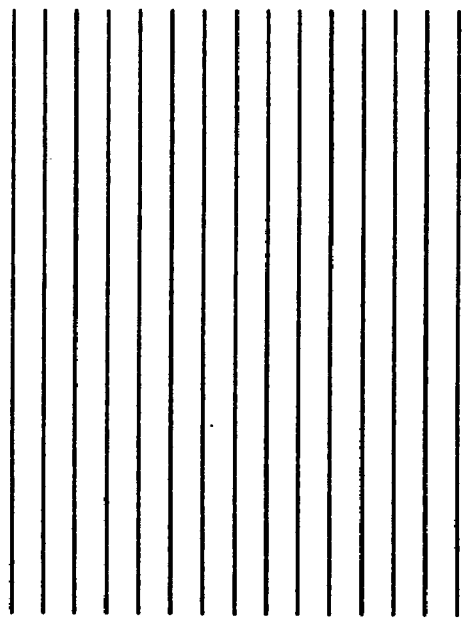

COMPRESSION ENCODING APPARATUS, ENCODING METHOD, DECODING APPARATUS, AND DECODING METHOD

BACKGROUND OF THE INVENTION

1. Field of the Invention

The invention relates to a compression encoding apparatus and an encoding method for highly efficiently compressing an image signal and a decoding apparatus and a decoding method for decoding image information in a system for transmitting the image information according to the rule of, for instance, the MPEG, JPEG, or the like.

2. Description of the Related Art

In a system for transmitting image information, a compression encoding apparatus for compression encoding an image signal and a decoding apparatus for decoding the image signal from the compression encoded signal are indispensable elements. In order to enable the compression encoding apparatus and decoding apparatus to cope with multimedia, namely, to be applied to various image information transmitting means or receiving means, the MPEG, JPEG, or the like has been determined as a rule to be obeyed.

The MPEG is a rule regarding a transmitting method of, for example, a motion image such as a video image or the like. As a compression encoding method, there is used a combination of a motion compensation interframe predictive encoding method for performing an information compression using a time correlation, an encoding method by a discrete cosine transformation (hereinafter, referred to as a DCT) as an orthogonal encoding for performing an information compression using a spatial correlation, and a Huffman encoding method as an entropy encoding (variable length encoding) for performing an information compression using a deviation of an appearance probability of a code that is formed by the above encoding method.

Among them, the motion compensation interframe predictive encoding method is necessary in a system for transmitting a motion image and is used in the MPEG or the like. The motion compensation interframe predictive encoding is executed by using each frame in the signal as a unit with reference to the other frames. In the MPEG, with respect to the motion compensation interframe predictive encoding, three picture types of an I picture, a P picture, and a B picture are refines as for each frame.

The I picture is an image which is intraframe encoded, namely, which is encoded without referring to the other frames and is not a target of the motion compensation interframe predictive encoding. The P picture is an image which is motion compensation interframe predictive encoded by a forward prediction, namely, by referring to the preceding frame. Further, the B picture is an image which is both-direction predicted. That is, the B picture is an image which is motion compensation interframe predictive encoded by referring to the preceding frame and the subsequent frames.

The picture types of the frame in which the other frames are referred to in order to perform the motion compensation interframe predictive encoding are the I picture and the P picture. The B picture cannot be referred to. That is, the frame which is referred to in order to perform the motion compensation interframe predictive encoding the P picture is the preceding I picture or P picture. In order to execute the motion compensation interframe predictive encoding the B picture, it is necessary to refer to the preceding frame (I picture or P picture) and the subsequent frame (I picture or P picture).

Therefore, the process for motion compensation interframe predictive encoding the B picture can be executed only after the frame (I picture or P picture) existing at the subsequent position in the inputted image signal was processed. Therefore, the order of the frames in the image signal which is inputted differs from the processing order. Therefore, after the reordering of the order of the frames in the inputted image signal was performed, the resultant signal is supplied to means for performing the motion compensation interframe predictive encoding. As will be explained hereinlater, a memory is used when performing such a reordering process.

After the motion compensation interframe predictive encoding was performed, the compression encoding apparatus according to the rule of the MPEG executes the encoding by the DCT and the Huffman encoding as an entropy encoding (variable length encoding) as mentioned above, thereby forming the compression encoded signal. The compression encoded signal is transmitted.

Therefore, the image signal which is formed by decoding the transmitted compression encoded signal by the decoding apparatus is the signal in which the order of the frames is reordered. Thus, a process to return the order of the frames to the original order is necessary. As will be explained hereinlater, when the process to return the order of the frames is executed, a memory which is provided in association with the decoding apparatus is used.

The JPEG is the rule regarding the transmission of, for instance, a still image in a facsimile transmission or the like. Different from the MPEG which deals with the motion image, since there is no need to perform the motion compensation interframe predictive encoding method, a combination of the encoding method by the DCT and the Huffman encoding method is used as a compression encoding method.

The processes by the compression encoding and decoding apparatuses as mentioned above progress by transmitting and receiving data to/from the memory as shown in FIG. 15. Therefore, a memory is provided in association with the compression encoding and decoding apparatuses. Roles which are performed by the memory will now be described hereinbelow.

As described above, first, in the compression encoding apparatus which deals with the motion image, the memory is used to temporarily store the input image signal for the purpose of reordering of the frames which are necessary due to the use of the motion compensation interframe predictive encoding method. That is, the order of the frames when they are taken out from the memory is controlled so as to be suitable for executing the motion compensation interframe predictive encoding. The memory also plays a role of storing the frame (local decoded image which will be explained hereinlater which is referred to as a reference to execute the motion compensation interframe predictive encoding method.

Further, the memory is also used to assure the image signal for a predetermined time prior to the process by the compression encoding and decoding apparatuses in order to recognize the nature of each frame including, for example, a scene change or the like. As mentioned above, the memory is also used in the compression encoding apparatus which deals with any one of a motion image and a still image.

On the other hand, the memory which is provided in association with the decoding apparatus which handles the motion image is used to store the signal that is referred as a reference in the decoding corresponding to the motion compensation interframe predictive encoding in the decoding corresponding to the compression encoding as mentioned above. After completion of the decoding, the memory is also used to temporarily store the decoded image signal for the process to return the order of the frames to the original order in the image signal. That is, it is controlled so that the order when taking out the decoded image signal from the memory is returned to the original order of the image signal.

It is assumed that the memory which is provided in association with the compression encoding and decoding apparatuses stores the frames in a range from a few frames to tens of frames in accordance with conditions such as performance of the image transmission system, nature of an image to be treated, and the like. Therefore, generally, a memory having a large memory capacity is necessary as such a memory. For instance, the compression encoding and decoding apparatuses which have conventionally been used need a memory of a capacity of at least 16 to 32 Mbits and, in a large case, 320 Mbits.

As mentioned above, the compression encoding and decoding apparatuses which are used in the image information transmission system according to the rule of the MPEG, JPEG, or the like need the memory of a large memory capacity for performing the processes. Therefore, the costs of the memory provided in association with the compression encoding and decoding apparatuses become one of factors of the increase in costs of the whole system.

OBJECTS AND SUMMARY OF THE INVENTION

It is, therefore, an object of the invention to provide a compression encoding apparatus, an encoding method, a decoding apparatus, and a decoding method which can reduce a capacity of a memory which is provided in association with a compression encoding apparatus and a decoding apparatus in an image information transmission system according to a rule of the MPEG, JPEG, or the like.

According to the invention of Claim 1, there is provided a compression encoding apparatus for encoding an image signal, comprising: a memory; a compressing circuit for compressing an input image signal; a decompressing circuit for decompressing the signal compressed by the compressing circuit; a memory control circuit for controlling writing and reading operations of the signal compressed by the compressing circuit for the memory; and an encoding circuit for encoding the image signal decompressed by the decompressing circuit.

According to the invention of Claim 12, there is provided a decoding apparatus for decoding an encoded image signal, comprising: a memory; a decoding circuit for decoding the encoded image signal; a compressing circuit for compressing the image signal which was decoded by the decoding circuit and is stored into the memory; a decompressing circuit for decompressing the signal compressed by the compressing circuit; and a memory control circuit for controlling writing and reading operations of the signal compressed by the compressing circuit for the memory.

According to the invention of Claim 17, there is provided an encoding method of encoding an image signal, comprising: a compressing step of compressing an input image signal a predetermined compressing method; a step of writing the compressed signal into a predetermined memory; a step of reading out the compressed signal stores in the predetermined memory; a decompressing step of decompressing the read-out signal; and an encoding step of encoding the decompressed image signal in order to transmit the signal.

According to the invention of Claim 28, there is provided a decoding method of decoding an encoded image signal, comprising: a decompression decoding step of decoding the encoded image signal; a compressing step of compressing the decoded image signal which is stored into a predetermined memory by a predetermined compressing method; a step of writing the compressed signal into the predetermined memory; a step of reading out the compressed signal stored in the predetermined memory; and a decompressing step of decompressing the read-out signal.

According to the inventions of Claims 1 and 17, an information amount of the signal to be written into the memory which is provided in association with the compression encoding apparatus can be reduced by executing other compression and decompression different from the main compression encoding which is executed in accordance with the MPEG standard or the like. Therefore, the memory capacity which is necessary can be reduced.

According to the inventions of Claims 12 and 28, an information amount of the signal to be written into the memory which is provided in association with the decoding apparatus can be reduced by executing other compression an decompression different from the decoding corresponding to the main compression encoding which is executed in accordance with the MPEG standard or the like. Therefore, the memory capacity which is necessary can be reduced.

The above and other objects and features of the present invention will become apparent from the following detailed description and the appended claims with reference to the accompanying drawings.

BRIEF DESCRIPTION OF THE DRAWINGS

FIG. 9 is a schematic diagram for explaining a DPCM compression that is executed in the first embodiment of the invention;

FIG. 15 is a schematic diagram for explaining conventional compression encoding and decoding in an image transmission system of the MPEG, JPEG, or the like.

DETAILED DESCRIPTION OF THE PREFERRED EMBODIMENTS

First Embodiment

Figure 1:
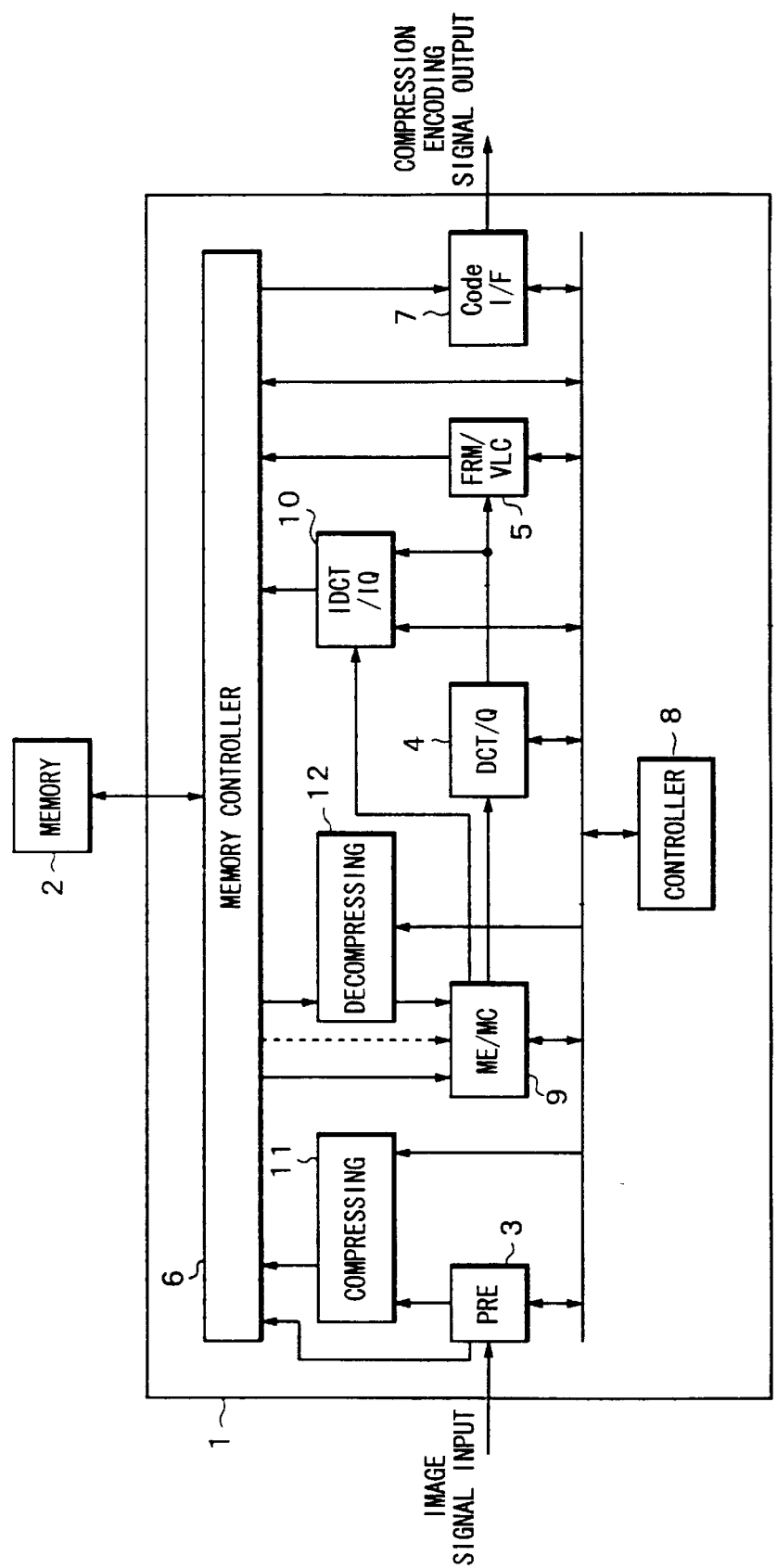
FIG. 1 is a block diagram showing a construction of the first embodiment of the invention.

The first embodiment of the invention will now be described hereinbelow. The first embodiment of the invention relates to a case of applying the invention to a compression encoding apparatus in a transmission system according to the rule of the MPEG. FIG. 1 shows a block diagram of the first embodiment of the invention. A memory 2 is provided in association with an encoder 1 serving as a compression encoding apparatus.

A pre-processing unit 3 receives an image signal and executes predetermined processes to the received image signal. A motion detection/compensation processing circuit 9, a DCT/quantizing circuit 4, and a Huffman encoding circuit 5 execute a compression encoding process as will be explained hereinlater to an output of the pre-processing unit 3. An inverse DCT/inverse quantizing circuit 10 executes a process opposite to that of the DCT/quantizing circuit 4 in order to form a signal which is referred to for the process by the motion detection/compensation processing circuit 9 as will be explained hereinlater. A memory controller 6 controls a transmission and a reception of the signal between each component element in the encoder 1 as mentioned above and the memory 2. Further, a code interface 7 outputs the encoded signal as an MPEG video bit stream. A controller 8 integratedly controls the operation of the whole encoder 1.

A signal compressing circuit 11 executes a compression for enabling a capacity of the memory 2 to be reduced. This compression differs from a main compression, namely, a compression encoding that is executed in accordance with the rule of the MPEG or the like. A signal decompressing circuit 12 reconstructs the signal compressed by the signal compressing circuit 11 to the original signal.

The operation for the processes which are executed in the first embodiment of the invention will now be described. The inputted image signal is subjected to predetermined processes such as a conversion from, for instance, (4:2:2) to (4:2:0) and the like by the pre-processing unit 3 and, after that, the resultant signal is supplied to the signal compressing circuit 11. The signal compressing circuit 11 compresses the signal as will be explained hereinlater and supplies to the memory controller 6. The memory controller 6 writes the supplied signal into the memory 2. As a result of the progress of the writing operation, the compressed image signal of an amount enough to start the encoding is accumulated in the memory 2. Further, nature such that a scene change is included or the like with respect to the image stored in the memory 2 as mentioned above is recognized.

After the conditions to start the encoding were satisfied as mentioned above, the compressed image signal, namely, the image signal to be subjected to the main compression encoding and an image signal that is referred to in order to detect the motion of the image signal are supplied from the memory 2 to the signal decompressing circuit 12 in accordance with an instruction of the controller 8. The signal decompressing circuit 12 reconstructs the supplied signal, namely, the compressed image signal to the original data as will be explained hereinlater. The reconstructed signal is supplied to the motion detection/compensation processing circuit 9. When the reconstructed image signal is supplied to the motion detection/compensation processing circuit 9 in this manner, the reordering of the order of the frames in the image signal that is inputted is executed as mentioned above.

The motion detection/compensation processing circuit 9 executes a motion detecting/compensating process (ME/MC) as a motion compensation interframe predictive encoding method mentioned above. That is, a motion compensating process such that a motion between the signal supplied from the signal decompressing circuit 12 (the image signal to be subjected to the main compression encoding) and a reference image signal is detected and a difference between the target frame and a frame that is referred as a reference is obtained in accordance with the detection result is executed, thereby performing the information compression using the time correlation of the supplied signal. Information regarding the image signal is supplied from the memory controller 6 to the motion detection/compensation processing circuit 9 as necessary as shown by a broken line. The signal encoded by the motion detection/compensation processing circuit 9 as mentioned above is supplied to the DCT/quantizing circuit 4. The image signal of the frame that is referred to in the motion detection is held in the inverse DCT/inverse quantizing circuit 10. The image signal which needs an intraframe encoding is supplied to the DCT/quantizing circuit 4 as it is.

The DCT/quantizing circuit 4 executes a DCT as an orthogonal transformation to the supplied signal and further quantizes the pixel value calculated by the DCT. In this manner, the information compression using the spatial correlation of the supplied signal is performed. The signal encoded by the DCT/quantizing circuit 4 is supplied to the Huffman encoding circuit 5 and is also supplied to the inverse DCT/inverse quantizing circuit 10.

The Huffman encoding circuit 5 executes, for example, a two-dimensional Huffman encoding to the supplied signal. The Huffman encoding is an encoding method in which the entropy encoding (variable length encoding) is embodied. That is, it is an encoding method whereby a long code length is allocated to a value of a low appearance probability for the code value formed by the encoding accompanied with the information compression as mentioned above which is executed by the motion detection/compensation processing circuit 9 and DCT/quantizing circuit 4 and a short code length is allocated to the value having a high appearance probability, thereby reducing the information amount of the whole signal.

The signal which is formed by the Huffman encoding circuit 5 is written into the memory 2 through the memory controller 6 and is outputted as an MPEG video bit stream at a predetermined transmission timing through the code interface. The MPEG video bit stream becomes a final output of the encoder 1.

The signal encoded by the DCT/quantizing circuit 4 as mentioned above is also supplied to the inverse DCT/inverse quantizing circuit 10. The inverse DCT/inverse quantizing circuit 10 executes an inverse DCT/inverse quantization to the signal supplied. As will be explained hereinlater, a local decoding image that is referred to in the process which is executed by the motion detection/compensation processing circuit 9 is formed from the inversely quantized signal and the image signal which is supplied from the motion detection/compensation processing circuit 9. As will be explained hereinlater, an output of the inverse DCT/inverse quantizing circuit 10 is selectively written as a local decoding image into the memory 2. No compression is executed at the time of such a writing operation. The intra-frame encoded image signal is written as it is into the memory.

Figure 2:
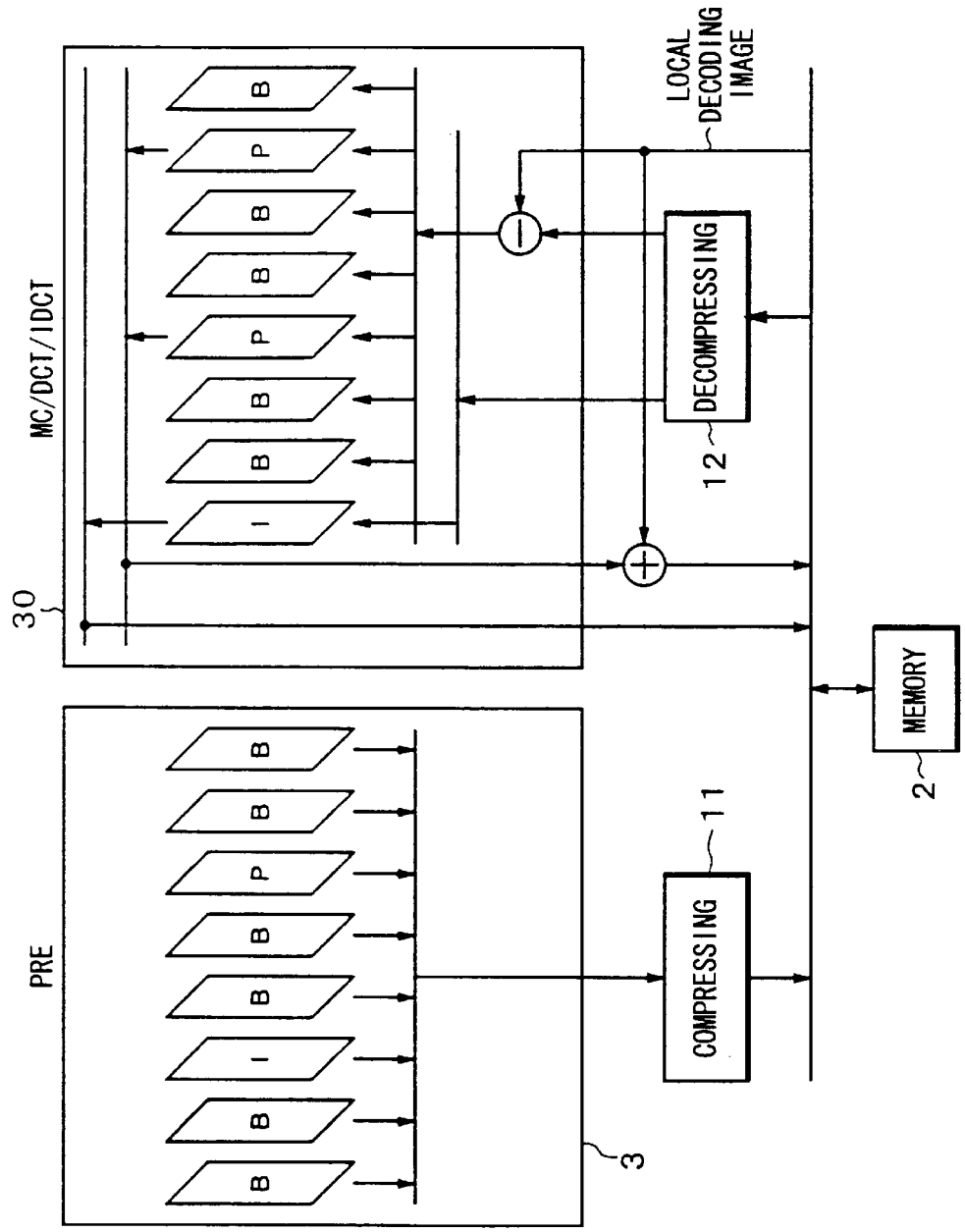
FIG. 2 is a schematic diagram for explaining a control which is executed in accordance with the picture type in the first embodiment of the invention.

The writing into the memory 2 mentioned above will now be described with reference to FIG. 2. As mentioned above, the pre-processing unit 3 supplies the image signal to the signal compressing circuit 11. In this instance, irrespective of the picture type, all of the frames in the input image signal are supplied to the signal compressing circuit 11 and is compressed and, after that, it is written into the memory 2. The processes which are executed by the motion detection/compensation processing circuit 9, DCT/quantizing circuit 4, and inverse DCT/inverse quantizing circuit 10 to the signal decompressed at the post stage of the signal compressing circuit 11, namely, by the decompressing circuit 12 are integratedly shown by a process 30 in FIG. 2. By those processes, the local decoding image is formed on the basis of the I picture and P picture and is written into the memory 2. That is, with respect to the I picture, the processing result by the foregoing process 30 is written as it is into the memory 2. As for the P picture, the processing result by the process 30 and the local decoding image signal read out from the memory 2 are added and, after that, a resultant signal is written into the memory 2.

As mentioned above, there are three picture types such as I picture, P picture, and B picture which are defined in the MPEG or the like. Among them, the P picture and B picture are encoded with reference to the other frames as mentioned above. That is, as for the P picture and B picture, a difference from the foregoing local decoding image is calculated by the motion detection/compensation processing circuit 9. The motion compensation interframe predictive encoding is executed on the basis of the calculated difference. Therefore, as shown in FIG. 2, the local decoding image is supplied to the motion detection/compensation processing circuit 9. As mentioned above, since the local decoding image is not compressed when it is written into the memory 2, the local decoding image is not decompressed when it is supplied from the memory 2 to the motion detection/compensation processing circuit 9.

On the other hand, when a certain signal is compressed and decompressed, generally, the signal is not perfectly returned to the original signal but includes errors to a certain degree. So long as the transmission of each frame, if the errors lie within an allowable range for the image quality that is required for the transmission system, no problem occurs. However, since the local decoding image relates to the encoding of the other frames as mentioned above, if the compression and decompression are executed to the local decoding image, the errors which are caused by the compression and decompression exert an influence on the encoding in a wide portion of the image signal and there is a fear such that they become a factor of deterioration of the quality of the whole image to be transmitted. To prevent it, as mentioned above, when the I picture and P picture which are used as a local decoding image are written into the memory 2 and when the signal is supplied from the memory 2 to the motion detection/compensation processing circuit 9, the compression and decompression are not performed.

Figure 3:
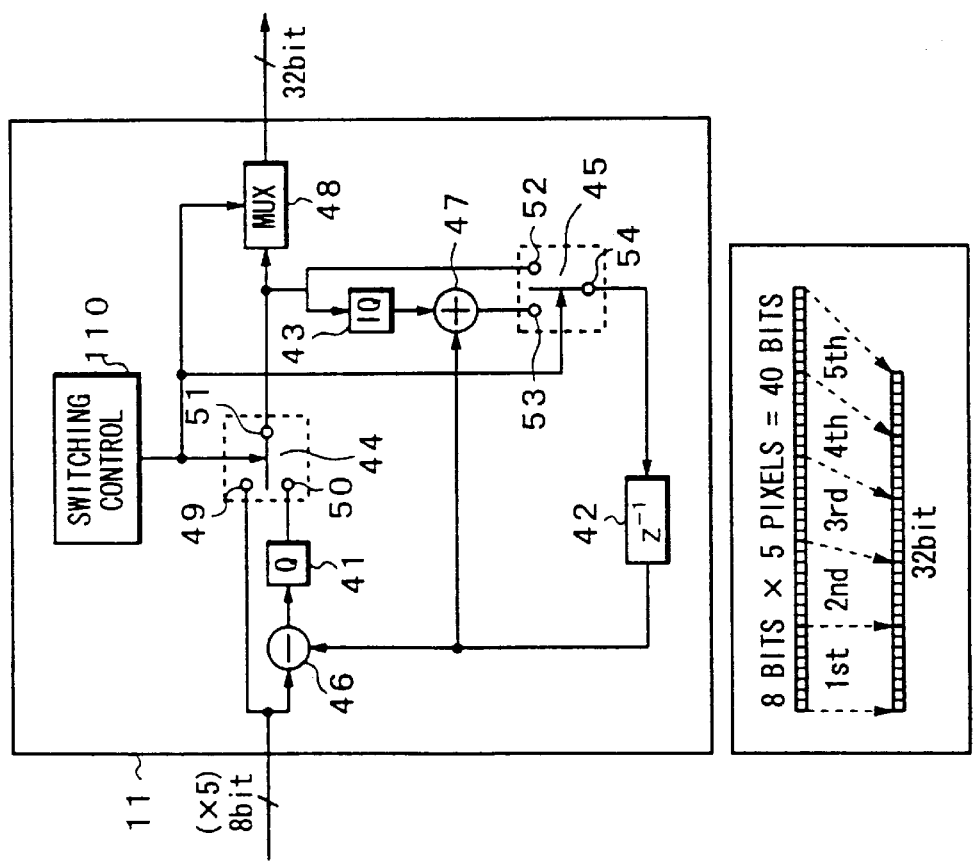
FIG. 3 is a block diagram showing in detail a partial construction of the first embodiment of the invention.

Another compression different from the main compression, namely, the compression that is performed by the signal compressing circuit 11 will now be described in detail. Such a compression is executed by, for example, a difference pulse code modulating method (hereinafter, referred to as a DPCM). In the first embodiment of the invention, 40 bits [namely, 8 (bits/pixel)×5 pixels=40 bits] corresponding to five pixels are compressed into 32 bits. FIG. 3 shows a detailed construction of the signal compressing circuit 11. A switching control circuit 110 controls switches 44 and 45 and a multiplexer 48, thereby switching a supply destination while setting each pixel to a unit.

The image signal is supplied every pixel, namely, on an 8-bit unit basis. When the first pixel is supplied, the switch 44 connects terminals 49 and 51 by an instruction of the switching control circuit 110. Therefore, the pixel data of 8 bits supplied is transmitted to the multiplexer 48 and switch 45. Further, when the first pixel data is supplied, the switch 45 connects terminals 52 and 54 by an instruction of the switching control circuit 110. Therefore, the first pixel data is supplied to a flip-flop 42.

When the second pixel is supplied, a difference between the second pixel data and the first pixel data stored in the flip-flop 42 as mentioned above is calculated by a subtractor 46. The difference is supplied to a quantizer 41 and is quantized into 6 bits. When the second pixel is supplied, the switch 44 connects terminals 50 and 51 in accordance with an instruction of the switching control circuit 110. Therefore, the data of 6 bits formed as mentioned above is supplied to the multiplexer 48 and to an inverse quantizer 43.

The inverse quantizer 43 inversely quantizes the supplied 6-bit data and sends to an adder 47. The adder 47 adds the data supplied from the inverse quantizer 43 and the first pixel data stored in the flip-flop 42 and reconstructs the second pixel data. When the second pixel is supplied, the switch 45 connects terminals 53 and 54 by an instruction of the switching control circuit 110. Therefore, the addition result, namely, the reconstructed second pixel data is stored into the flip-flop 42. The pixel data which was reconstructed and stored in the flip-flop 42 is used in the subtractor 46 and adder 47 when the pixel data which is subsequently inputted is processed.

Further, the third to fifth pixel data is also processed in a manner similar to the second pixel data and the 6-bit data is derived, respectively. Thus, as shown in a lower position of FIG. 3, the data (40 bits) as much as five pixels is compressed to the data of 32 bits. Each time the data of 32 bits is formed in this manner, it is outputted to the memory 2 via a bus capable of transferring 32 bits. As mentioned above, the compressed data corresponding to five pixels is written into one address in the memory 2.

After that, with regard to the sixth and subsequent pixel data as well, a process to compress the 40-bit data as much as five pixels as a processing unit into the data of 32 bits is executed in a manner similar to the above operation. Therefore, the compression of 4/5 is always carried out with respect to the image signal that is inputted to the signal compressing circuit 11.

Figure 4:
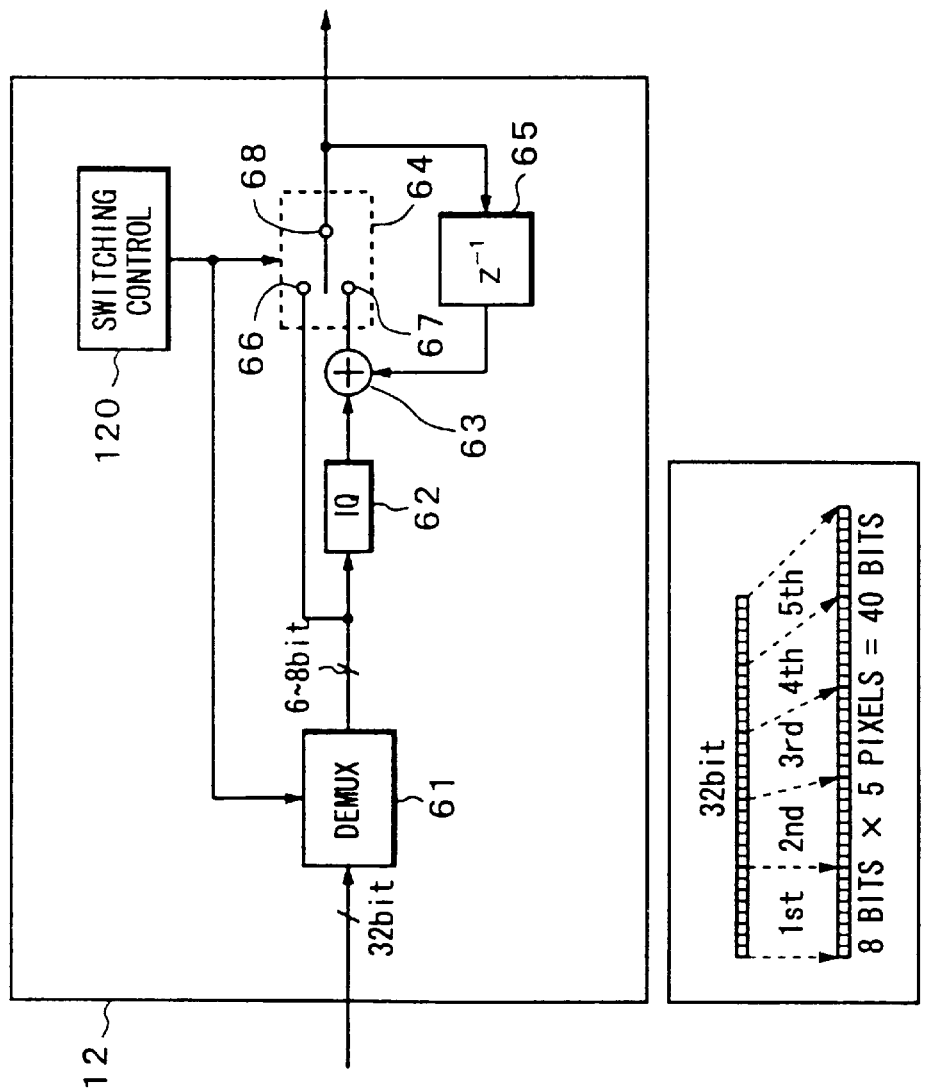
FIG. 4 is a block diagram showing in detail another partial construction of the first embodiment of the invention.

The decompression to reconstruct the original data from the data subjected to another compression different from the main compression, namely, the compression by the signal compressing circuit 11 will now be described. This decompression is executed by the signal decompressing circuit 12. A fundamental construction in this process is to perform a process opposite to the compression that is performed by the signal compressing circuit 11. In the first embodiment of the invention, therefore, a process to return the 32-bit data formed as mentioned above to the original 40-bit data is carried cut. FIG. 4 shows a detailed construction of the signal decompressing circuit 12. A switching control circuit 120 controls the switching of a supply destination which is executed by a demultiplexer 61 and a switch 64 while the pixel is set to a unit.

As mentioned above, the 32-bit data taken out from the memory 2 by an instruction of the controller 8 is supplied to the demultiplexer 61. The demultiplexer 61 supplies the pixel data in a manner such that the 8-bit pixel data (the pixel data in which the bit length is held to 8 bits in the above compression, namely, the first pixel data among five pixels which are set to a processing unit) in the 32-bit data which is supplied is processed first and the 6-bit data is subsequently processed at the second and subsequent times.

When the 8-bit data is outputted as the first data from the demultiplexer 61, the switch 64 connects terminals 66 and 68 in accordance with an instruction of the switching control circuit 120. Therefore, the 8-bit data passes through the signal decompressing circuit 12 and is stored into a flip-flop 65.

When the 6-bit data is outputted as second data from the demultiplexer 61, the 6-bit data is inversely quantized by an inverse quantizer 62 and is supplied to an adder 63. The adder 63 adds the data which is supplied from the inverse quantizer 62 and the first data stored in the flip-flop 65 and reconstructs the second data. When the 6-bit data is outputted as second data from the demultiplexer 61, the switch 64 connects terminals 67 and 68 by an instruction of the switching control circuit 120. Therefore, an output of the adder 63, namely, he reconstructed second pixel data passes through the signal decompressing circuit 12 and is stored into the flip-flop 65. As mentioned above, the reconstructed pixel data stored in the flip-flop 65 is used in the adder 63 when processing pixel data which is subsequently inputted.

After that, similar processes are also executed with respect to the third to fifth data. Thus, as shown in the lower portion of FIG. 4, the 32-bit data is decompressed to 40-bit data and is returned to the data of five pixels of 8 bits/pixel. After that, with regard to the data which is supplied to the signal decompressing circuit 12, in a manner similar to the above operation, the 32-bit data is returned as a group to the data of 40 bits, namely, 5 pixels. Therefore, the decompression of 5/4 is always performed with respect to the compression data that is inputted to the signal decompressing circuit 12.

The first embodiment of the invention has been described with respect to the case where the DPCM compression of 4/5 for compressing 40 bits as much as eight pixels into 32 bits is executed as other compression and decompression different from the main compression encoding. However, other optimum compression ratios can be also used from viewpoints of the memory capacity to be reduced and the quality and the like which are required for the image to be transmitted. The invention can be also applied to the case of handling the image signal in which the number of bits per pixel is equal to a data length other than 8 bits.

The compression and decompression as mentioned above can be also executed to both of the luminance signal and the chroma signal or can be also executed to only the chroma signal. It is sufficient to decide which one of the above methods is used in accordance with the memory capacity to be reduced and the quality and the like which are required for the image to be transmitted. Any compressing method other than the DPCM compression can be also used so long as it is effective in consideration of the memory capacity to be reduced and the quality and the like which are required for the image to be transmitted.

Figure 5:
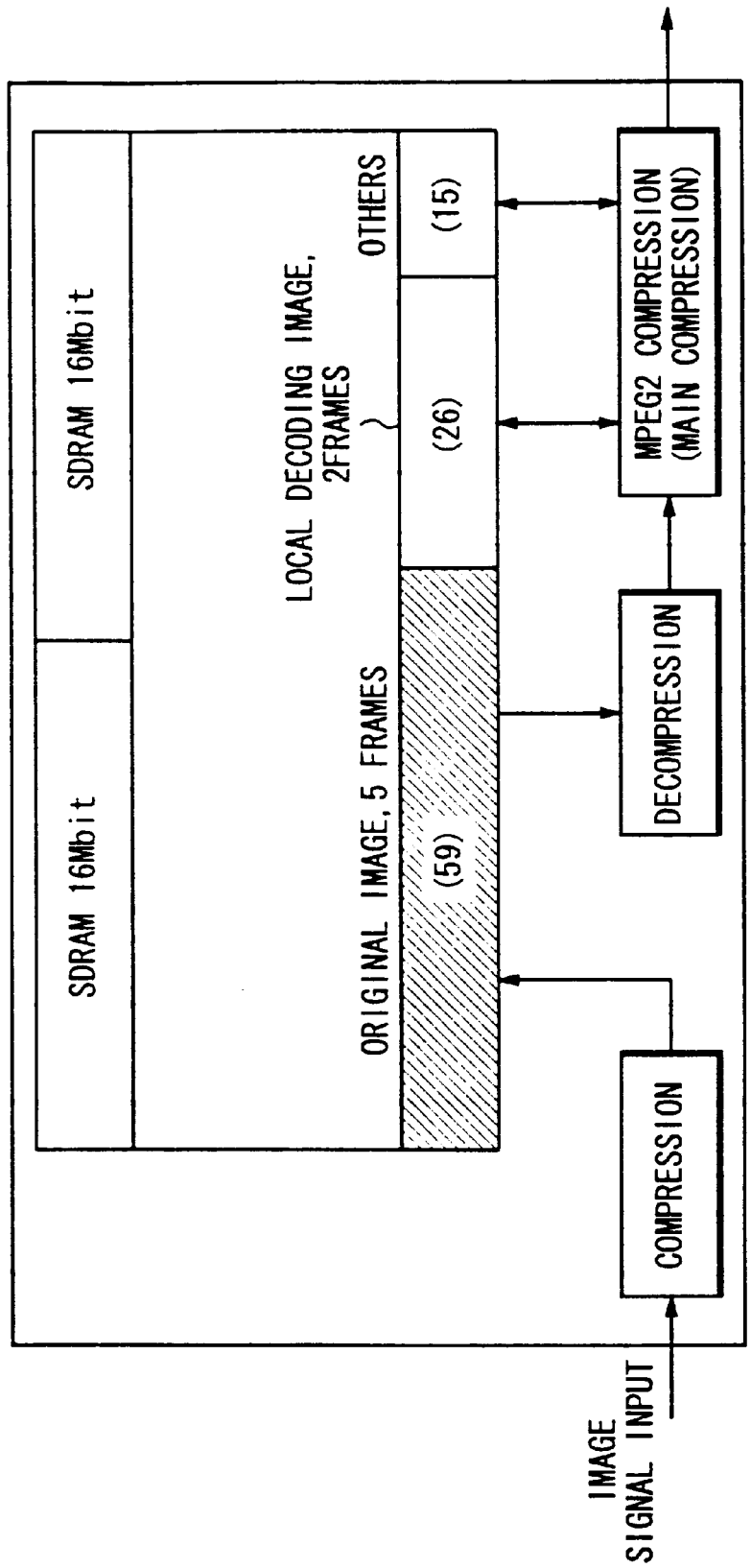
FIG. 5 is a schematic diagram for explaining the reduction of a memory capacity that is accomplished by the first embodiment of the invention.
Figure 6:
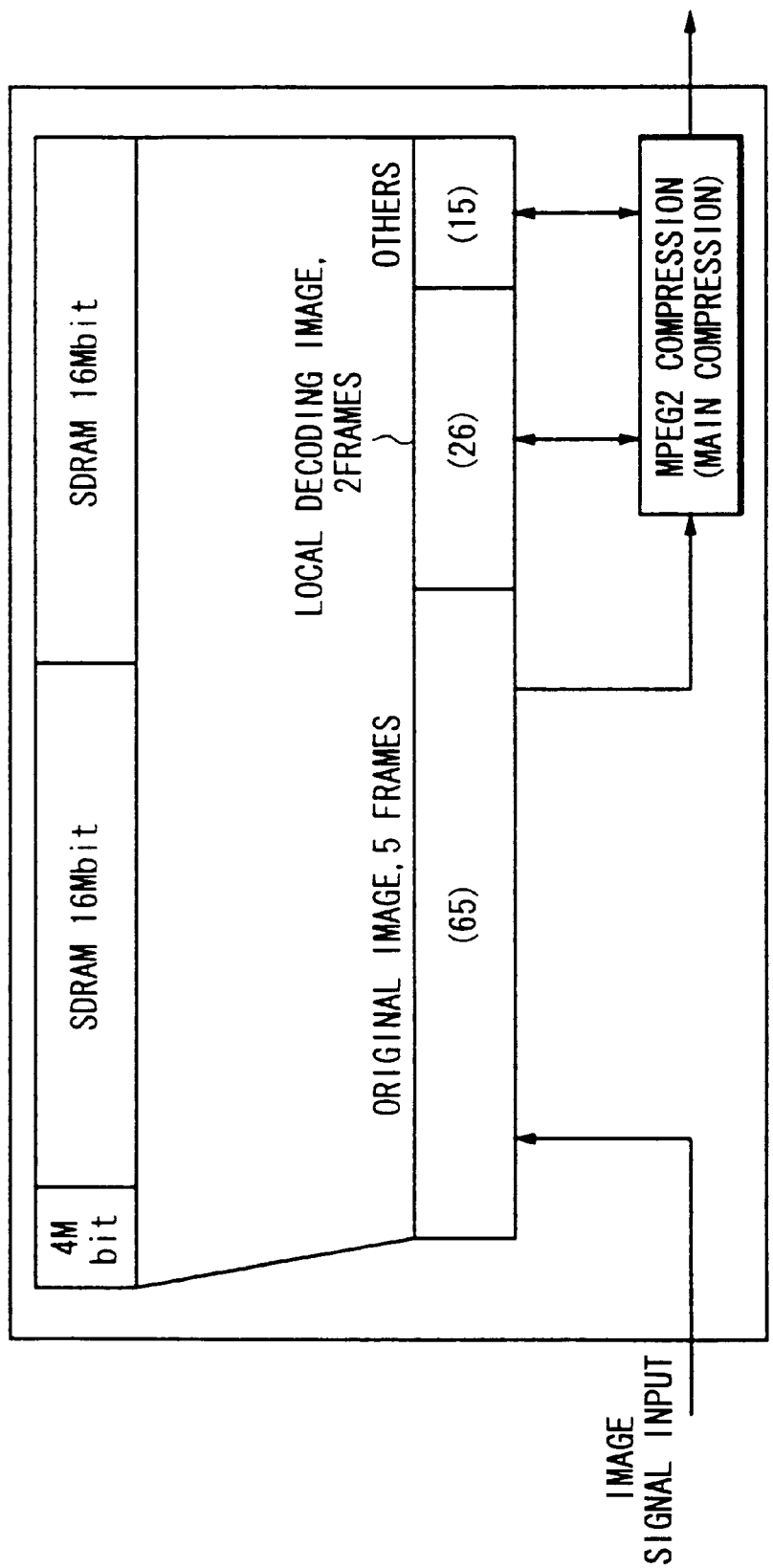
FIG. 6 is a schematic diagram for explaining the case where the invention is not applied for comparison with FIG. 5.

In the first embodiment of the invention, FIG. 5 shows a capacity of the memory which is used. FIG. 6 shows the case where the invention is not applied. An effect which is obtained by applying the invention with regard to the compression encoding apparatus constructed so as to store the original image as much as five frames prior to the compression encoding will now be described.

In the case shown in FIG. 6 where the invention is not applied, a ratio of the original image and the other portions (local decoding image and the others) is set to 65:41. On the other hand, in the case shown in FIG. 5 where the compression of 4/5 is performed to only the chroma signal in the first embodiment, since the information amount of the original image is compressed, the ratio of the original image and the other portions is equal to 59:41. Such compression of the information amount of the original image can be realized by another compression encoding different from the main compression as mentioned above. The memory capacity which is used in each case is shown in the upper portions of FIGS. 5 and 6. According to the diagrams, the memory capacity that is actually reduced is equal to 4 Mbits.

In case of FIG. 6, in addition to two 16-Mbit memories, one 4-Mbit memory is necessary. That is, in this case, three memories are necessary. On the other hand, in FIG. 5, since the necessary memory capacity was reduced, the compression encoding can be performed by using two 16-Mbit memories. In FIG. 5, therefore, when the compression encoding apparatus is designed as one chip, the number of pins of an LSI and the number of buses for transmitting and receiving data to/from the memories are also reduced. In other words, by applying the invention, an effect that the whole construction of the compression encoding apparatus is simplified is also obtained.

Second Embodiment

According to the first embodiment of the invention as mentioned above, as described with reference to FIG. 2, when another compression different from the main compression, namely, the compression by the signal compressing circuit 11 is executed to the inputted image signal and the compressed image signal is written into the memory, such a compression is performed to all of the portions in the image signal irrespective of the picture type. On the other hand, according to the second embodiment of the invention, it is also possible to construct such that the above compression is selectively executed in accordance with the picture type.

Figure 7:
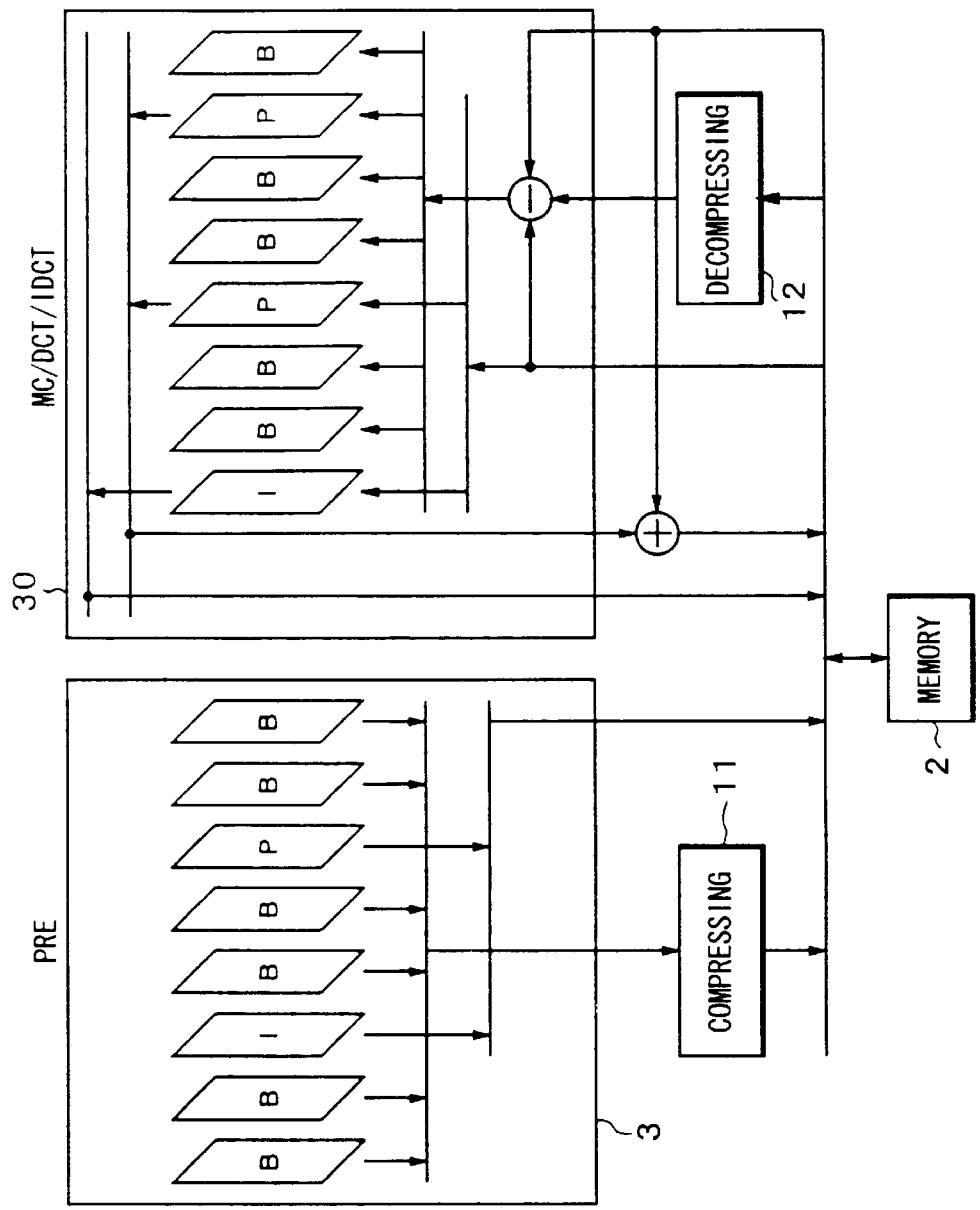
FIG. 7 is a schematic diagram for explaining a control which is executed in accordance with the picture type in the second embodiment of the invention.

A whole construction of the second embodiment of the invention is similar to that of the first embodiment described above by using FIG. 1. However, information regarding the picture type is supplied from the pre-processing unit 3 to the memory controller 6 and, further, to the motion detection/compensation processing circuit 9 through a path shown by broken lines in FIG. 1. The handling of the image signal in the signal compressing circuit 11 and signal decompressing circuit 12 will now be described with reference to FIG. 7. In a manner similar to FIG. 2 used in the description of the first embodiment of the invention, FIG. 7 shows the process 30 collectively showing the processes by the pre-processing unit 3 and the motion detection/compensation processing circuit 9, DCT/quantizing circuit 4, and inverse DCT/inverse quantizing circuit 10 at the post stage of the pre-processing circuit 3. As shown in FIG. 7, in the second embodiment of the invention, the other compression and decompression different from the main compression are executed to only the B picture and are not performed to the I picture and P picture.

That is, only the B picture is supplied from the preprocessing unit 3 to the signal compressing circuit 11 in FIG. 7 and is compressed and is subsequently written into the memory 2. The I picture and P picture are written into the memory 2 without being compressed. In the process integratedly shown as 30 at the post stage as mentioned above, the I picture and P picture are read out from the memory 2 and are not decompressed but are directly used as targets of the process integratedly shown as 30. As for the P picture, after the local decoding image was subtracted, it is used as a processing target. The B picture is read out from the memory 2 and is decompressed and, after that, it is supplied to the signal decompressing circuit 12. After the local decoding image was subtracted from the E picture decompressed by the signal decompressing circuit 12, the B picture is used as a processing target of the process 30 mentioned above.

The processing result based on the I picture according to the process 30 is written as it is into the memory 2. After the local decoding image read out from the memory 2 was added to the processing result based on the P picture by the process 30, the resultant data is written into the memory 2. The processing result by the process 30 based on the P picture and B picture written in the memory 2 as mentioned above is used as a local decoding image.

As mentioned above, the B picture is not referred to because the other pictures are treated in the compression encoding/decoding. Therefore, in the main compression, the compression ratio of the B picture is generally set to a value higher than those of the I picture and P picture. Therefore, the deterioration of the picture quality which is caused for the B picture by the main compression is larger than those caused for the I picture and P picture. When considering such a situation, an allowable range with respect to the picture quality deterioration occurring in the B picture by the other compression and decompression different from the main compression is wider than those of the I picture and P picture. Therefore, the compression ratio of the other compression and decompression different from the main compression for the B picture can be increased by an amount corresponding to that the other compression and decompression different from the main compression are not executed for the I picture and P picture.

In the second embodiment of the invention mentioned above, the compression and decompression are not executed to the I picture and P picture in consideration of significance of the local decoding image. There is also a case where errors of a certain extent are permitted in accordance with the conditions of the quality and the like which are required for the transmission image even when considering that the image is referred to as a local decoding image. In such a case, another compression different from the main compression can be also performed for the I picture and P picture at a compression ratio such that the errors lie within the allowable range.

Third Embodiment

There is the third embodiment of the invention as an example which can improve the accessing efficiency in the main compression. Prior to explaining the third embodiment of the invention, the relation between the accessing efficiency in the main compression and the size of unit which is subjected to another compression different from the main compression will now be described. As mentioned above, the DPCM compression is used as another compression different from the main compression.

Figure 8:
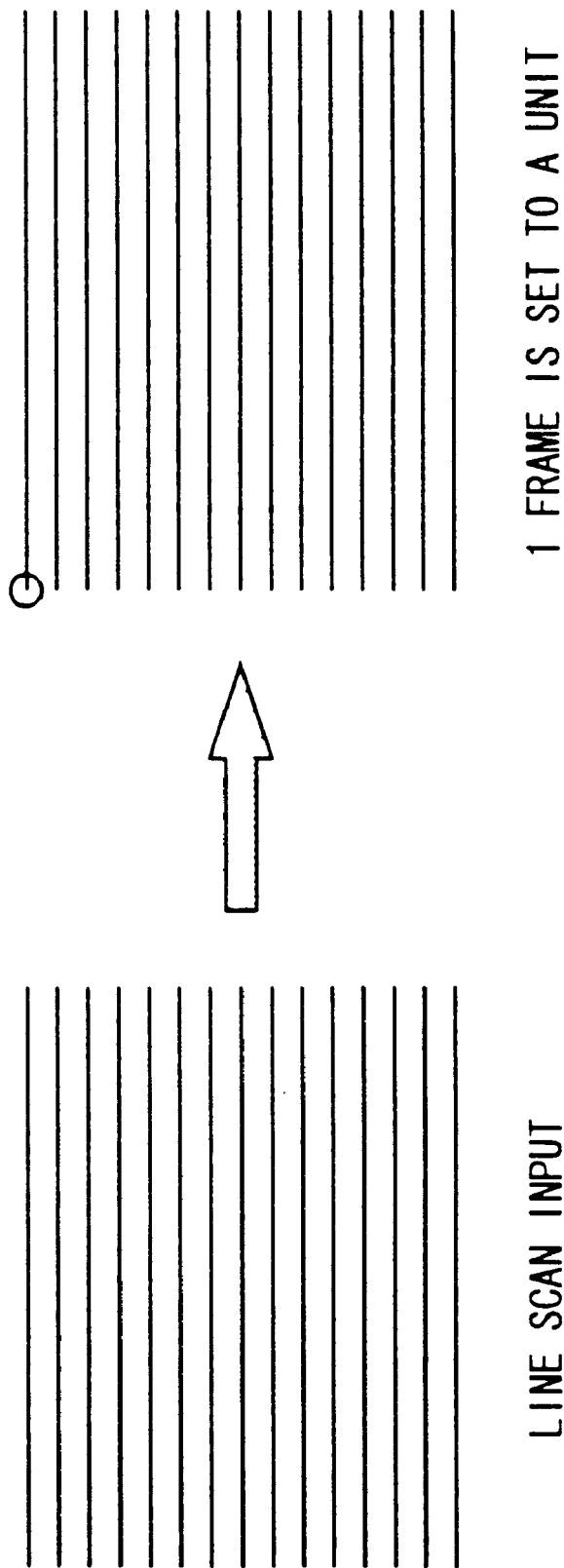
FIG. 8 is a schematic diagram for explaining a general DPCM compression.

In the general DPCM compression, the compression is executed on a frame or line unit basis. This state is shown in FIG. 8. In FIG. 8, each horizonal line shows one line. Further, in FIG. 8, one frame is shown by using 15 horizontal lines for simplicity of explanation. A position shown by ○ denotes a reset position. That is, only the pixel data at the reset position is transmitted without being compressed and with respect to all of the subsequent pixel data, a difference between the target pixel and the previous data is transmitted. Therefore, even in case of taking out, for example, only the last pixel data from the compression data of one frame, the decompression has to be sequentially performed from the position where the pixel data at the reset position shown with ○ is set to a start point.

On the other hand, in the signal compressing circuit 11 in the first embodiment of the invention mentioned above, as shown in FIG. 9, the reset position is set every unit (five pixels) smaller than one line. Therefore, when the decompression is performed by the signal decompressing circuit 12, it is possible to easily access to the data at an arbitrary position.

The third embodiment of the invention will now be described from the above viewpoint. A whole construction is similar to that of the first embodiment of the invention described by using FIG. 1. In the signal compressing circuit 11 in FIG. 1, the DPCM compression as another compression different from the main compression is executed by a method as will be explained hereinbelow, so that it is possible to easily access to the block at an arbitrary position when the processes are executed by the DCT/quantizing circuit 4 and inverse DCT/inverse quantizing circuit 10.

The DPCM compression as mentioned above will now be described with reference to FIG. 10. Now, a unit (macro block in the MPEG or the like) in which the access is performed in the main compression is called one block, the resetting of the DPCM compression as mentioned above is carried out on a predetermined unit of one block or less. In the following description, the unit of the DPCM compression as mentioned above is called a DPCM block. In the diagram shown on the right side in FIG. 10, a position shown by ○ is a reset position. The pixel at the reset position is transmitted by a data length as it is. One DPCM block in the diagram shown on the right side in FIG. 10 is made up of three segment lines among the short divided lines by setting the reset position as a start point.

Figure 10:
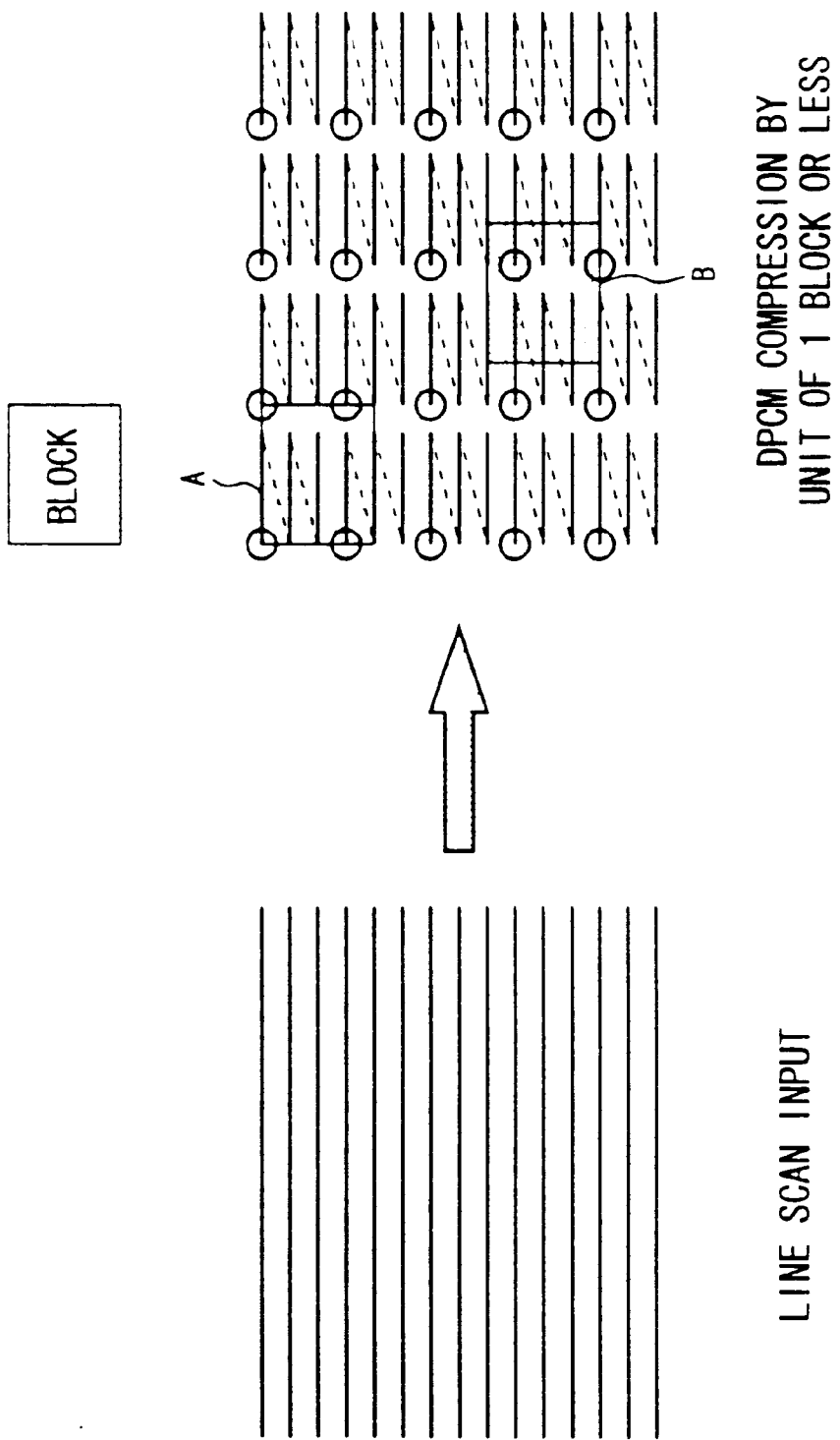
FIG. 10 is a schematic diagram for explaining a DPCM compression that is executed in the third embodiment of the invention.

In the example of FIG. 10, therefore, in order to access to the data of one block, it is sufficient to access to a few DPCM blocks which are different in dependence on the positions of the blocks. In order to access to a block A in the diagram, for instance, it is sufficient to access to four DPCM blocks. The number of DPCM blocks which are necessary to access to the data of one block becomes maximum in case of accessing to, for instance, a block B. At this time, as shown in the diagram, it is sufficient to access to six DPCM blocks.

As mentioned above, the size of DPCM block is set to be equal to or smaller than the size of unit (foregoing block) of the main compression and the DPCM compression as another compression different from the main compression is performed, thereby enabling another compression different from the main compression to be executed without deteriorating the accessing efficiency in the main compression. The capacity of the memory, consequently, which is provided in association with the compression encoding apparatus can be reduced while keeping the inherent accessing efficiency of the image information transmission system to which the invention is applied.

Fourth Embodiment

In the first embodiment or the like of the invention mentioned above, the feedback process has been executed in the main compression. That is, although the main compression is carried out by the motion detection/compensation processing circuit 9, DCT/quantizing circuit 4, and Huffman encoding circuit 5 at the post stage, the output of the DCT/quantizing circuit 4 is also supplied to the inverse DCT/inverse quantizing circuit 10 and is inversely DCT transformed/inversely quantized. The I picture and P picture formed by the inverse DCT/inverse quantization are written into the memory 2 without being compressed and are referred to as a local decoding image when the P picture and B picture which belong to the other frames in the image signal are processed by the motion detection/compensation processing circuit 9.

Figure 11:
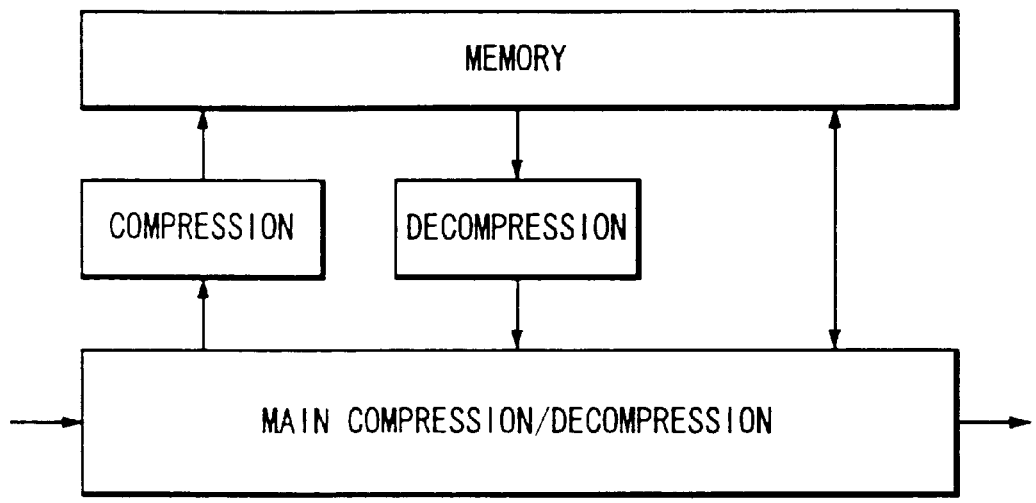
FIG. 11 is a schematic diagram for explaining a control which is executed in case of applying the invention to compression encoding and decoding apparatuses which are used in a system for transmitting a motion image.

Therefore, when the motion detecting/compensating process as one step in the main compression is executed to a series of image signal, the result (output of the inverse DCT/inverse quantizing circuit 10) of the process which is executed with respect to the frames in the image signal is concerned with the processes of the other frames. Therefore, in the first embodiment or the like of the invention mentioned above, as shown in FIG. 11, the other compression and decompression different from the main compression are selectively executed with respect to each frame in the signal. That is, as mentioned above, the signal portion such as a local decoding image or the like which is referred to in the main process is not a target of the other compression and decompression different from the main compression.

Figure 12:
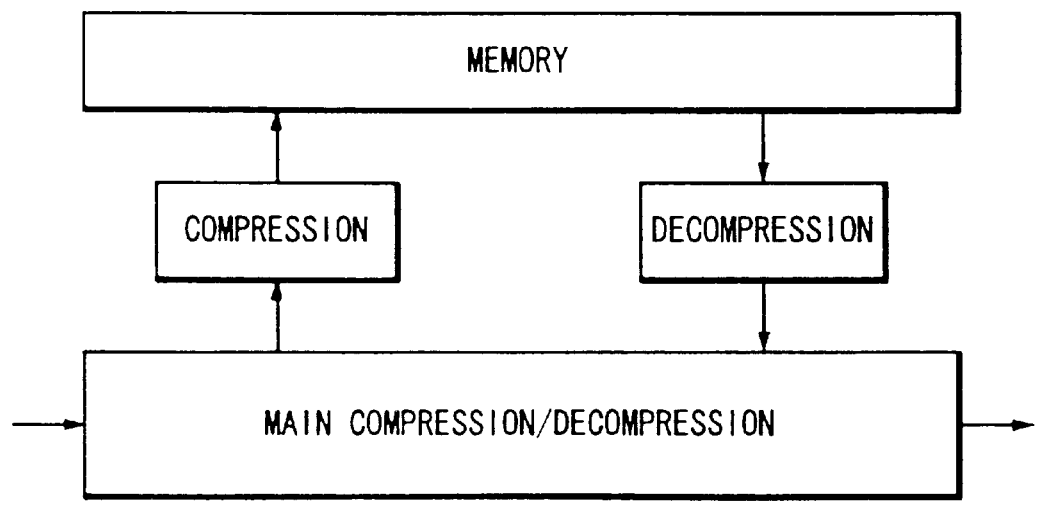
FIG. 12 is a schematic diagram for explaining a control which is executed in case of applying the invention to compression encoding and decoding 1apparatuses which are used in a system for transmitting a still image.

On the other hand, as a fourth embodiment of the invention, the invention can be also applied to a compression encoding apparatus in which the feedback process is not performed in the main compression. Such a compression encoding apparatus is used in an image transmission system according to the rule such as JPEG or the like for transmitting a still image. Different from the method according to the rule such as MPEG or the like which handles a motion image, in such a system, there is no need to perform the motion compensation interframe predictive encoding. Therefore, since it is unnecessary to use the local decoding image as mentioned above, there is also unnecessary to perform the control such that the other compression and decompression different from the main compression are not executed to the specific picture type or the like. Therefore, as shown in FIG. 12, the signal compressing circuit 11 and signal decompressing circuit 12 operate so as to compress and decompress all of the image signals which are supplied.

Figure 13:
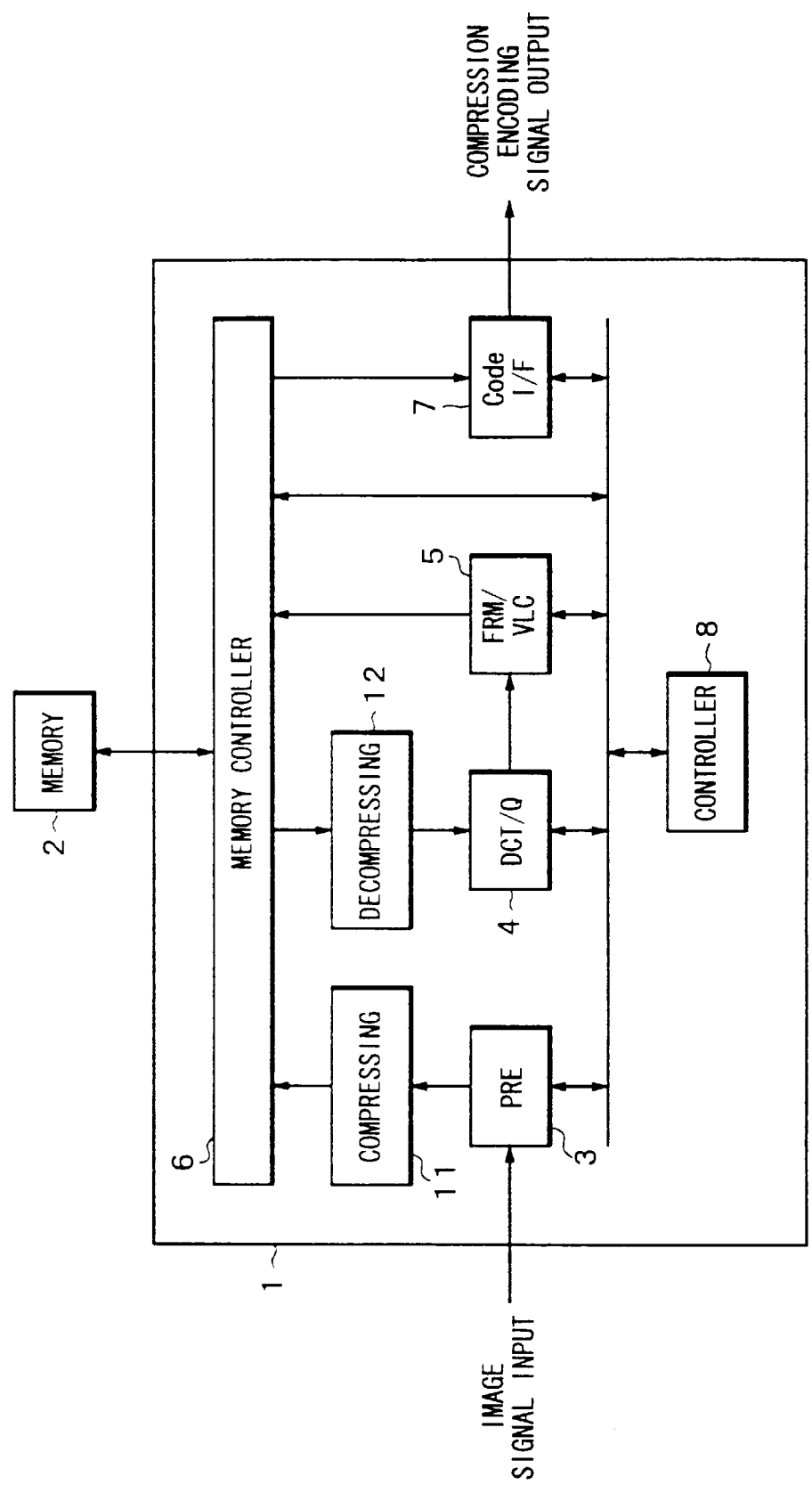
FIG. 13 is a block diagram showing a construction of the fourth embodiment of the invention.

FIG. 13 shows a whole construction of the fourth embodiment of the invention. In FIG. 13, component elements similar to those in the first embodiment of the invention described by using FIG. 1 are designated by the same reference numerals. As mentioned above, since there is no need to perform the motion compensation interframe predictive encoding, the motion detection/compensation processing circuit 9 in FIG. 1 is not included in FIG. 13. Further, since there is also no need to use the foregoing local decoding image, the inverse DCT/inverse quantizing circuit 10 in FIG. 1 which is provided to form the local decoding image is not included in FIG. 13. The signal compressing circuit 11 and signal decompressing circuit 12 compress and decompress all of the signals which are supplied because of the reasons as mentioned above.

In this case, all of the supplied signals are compressed and decompressed at a predetermined compression ratio and the memory capacity can be decreased by an amount corresponding to such compression/decompression.

Fifth Embodiment

Figure 14:
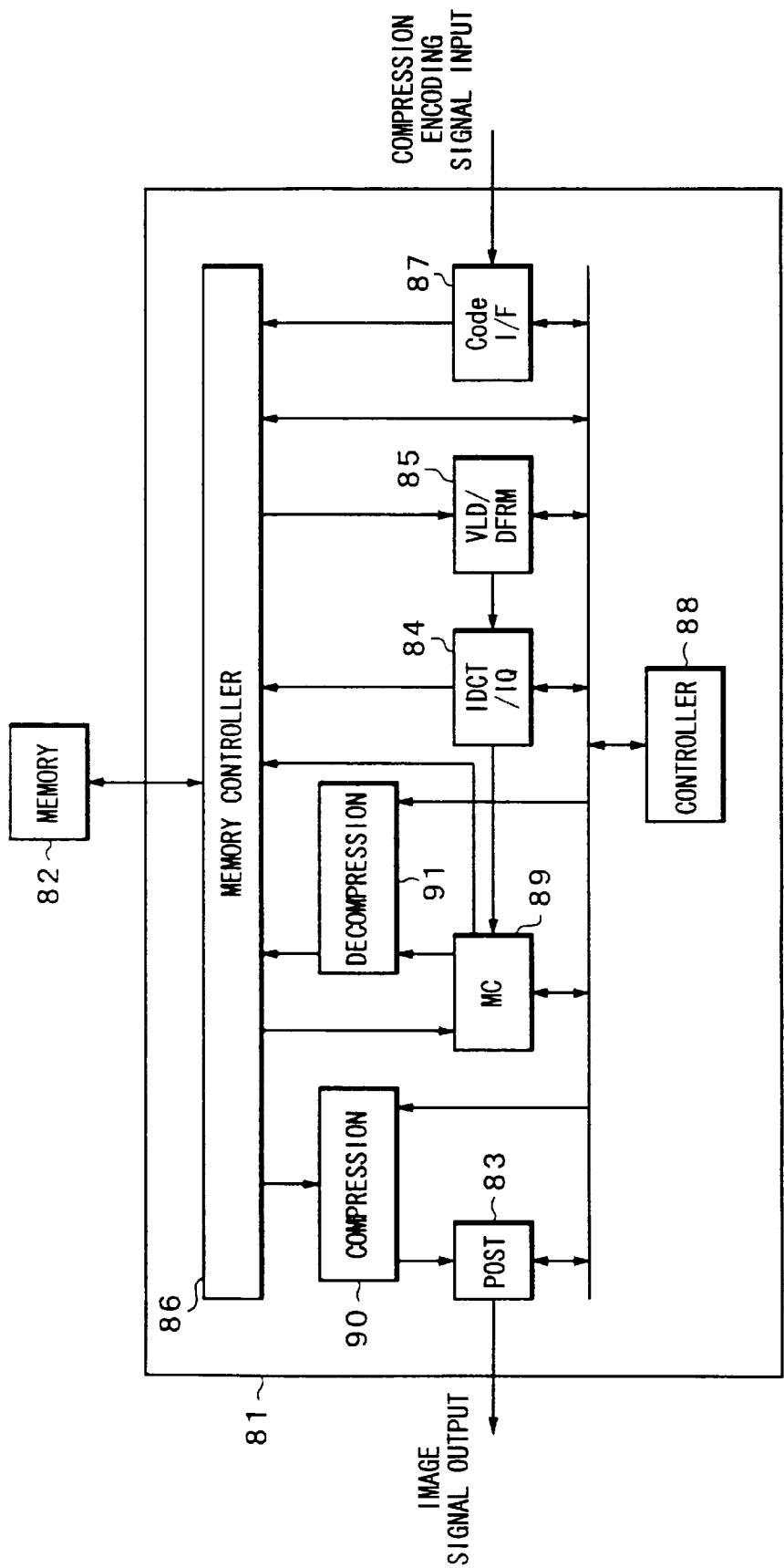
FIG. 14 is a block diagram showing a construction of the fifth embodiment of the invention.
Figure 15:
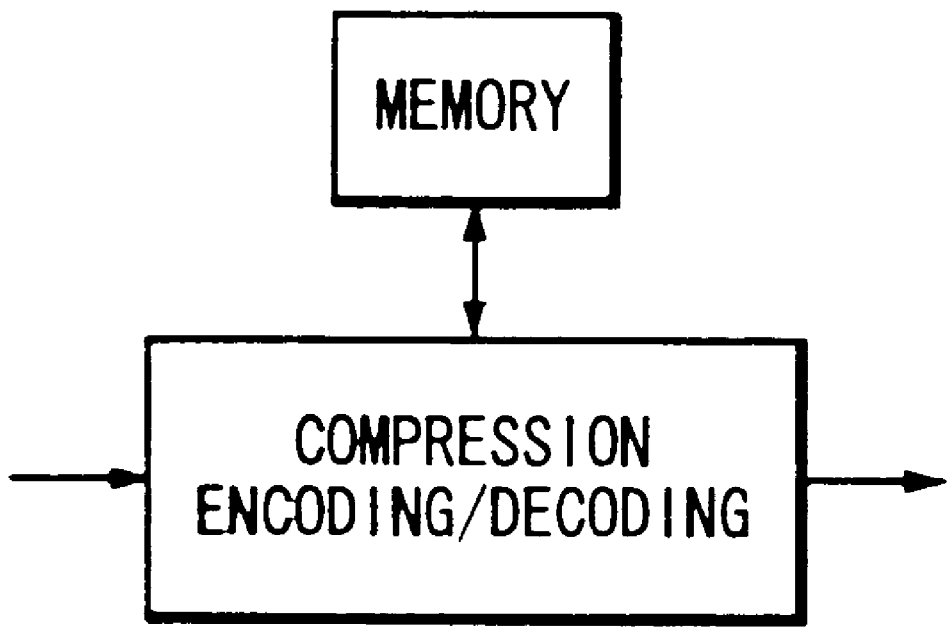

Each of the first to fourth embodiments of the invention mentioned above relates to the case where the invention is applied to the compression encoding apparatus. On the other hand, the fifth embodiment of the invention, which will be explained hereinlater, relates to the case where the invention is applied to The decoding apparatus in the transmission system according to the rule of the MPEG including the first embodiment of the invention mentioned above. With this construction, the capacity of the memory provided in association with the decoding apparatus can be reduced. FIG. 14 shows a whole construction of the fifth embodiment of the invention. A memory 82 is provided in association with a decoder 81 serving as a decoding apparatus.

A code interface 87 receives a compression encoding signal, executes predetermined processes to the received compression encoding image signal, and supplies the resultant signal to the post stage. A Huffman decoding circuit 85, an inverse DCT/inverse quantizing circuit 84, and a motion compensation processing circuit 89 execute a decoding process as will be explained hereinlater in accordance with the rule of the MPEG. In the processing result, the motion compensation processing circuit 89 supplies a predetermined result, as a local decoding image, based on the I picture and B picture to a memory controller 86. In this manner, the local decoding image is written into the memory 82 and is read out and referred to as necessary in the operation of the motion compensation processing circuit 89. The memory controller 86 controls the transmission and reception of signals between the component elements in the decoder 81 as mentioned above and the memory 82. A post-processing unit 83 receives the decoded image signal and performs predetermined processes and, after that, outputs the resultant signal as an output of the decoder 81 to the post stage. A controller 88 integratedly controls the whole operation of the decoder 81.

A signal compressing circuit 91 executes a compression to enable the capacity of the memory 82 to be reduced. A signal decompressing circuit 90 reconstructs the original signal from the signal compressed by the signal compressing circuit 91.

The operation of the fifth embodiment of the invention will now be described. The transmitted compression encoding signal serving as an input to the decoder 81 is written into the memory 82 through the code interface 87. The signal is taken out in accordance with an instruction of the controller 88 and is supplied to the Huffman decoding circuit 85. The Huffman decoding circuit 85 performs a decoding (variable length decoding) corresponding to the Huffman encoding to the supplied compression encoding signal.

The signal derived as a result of the Huffman decoding is supplied to an inverse DCT/inverse quantizing circuit 84. The inverse DCT/inverse quantizing circuit 84 executes the decoding by the inverse DCT/inverse quantization corresponding to the encoding by the foregoing DCT/quantization to the supplied signal. The signal decoded by the inverse DCT/inverse quantization is supplied to the motion compensation processing circuit 89. In the signal, the I picture and P picture are written into the memory 82 in order to refer to them in the process by the motion compensation processing circuit 89. The I picture is decoded by the inverse DCT/inverse quantizing circuit 84 and, after that, is written into the memory 82 as it is. The P picture is motion compensated by the motion compensation processing circuit 89 and, after that, is written into the memory 82.

With reference to the I picture and P picture written in the memory 82 as mentioned above, the motion compensation processing circuit 89 executes the motion compensating process on the basis of the supplied signal. The motion compensating process is a decoding corresponding to the motion detecting/compensating process in the foregoing compression encoding. An output of the motion compensation processing circuit 89 is made up of each frame which was perfectly decoded as an image signal. However, as mentioned above, at the time of the compression encoding, since the reordering is performed in order to execute the motion compensation interframe predictive encoding, the order of the frames differs from the order in the original image signal. Therefore, in order to return the order of the frames in the decoded image signal to the original order, after the frames were once written into the memory 82, they are taken out in accordance with the order in the original image signal.

The processes for returning the order of the frames to the original order as mentioned above will now be specifically explained. The output of the motion compensation processing circuit 89 is supplied to the signal compressing circuit 91. The signal compressing circuit 91 compresses the supplied signal and writes the compressed signal into the memory 82 through the memory controller 86. The signal written in the memory 82 is taken out in accordance with the order of the frames in the original image signal in accordance with an instruction of the controller 88. When the signal is taken out, the synchronization with, for example, the signal such as an audio signal or the like other than the image signal is also considered. The extracted signal is decompressed by the signal decompressing circuit 90 and the original image signal is reconstructed. The reconstructed image signal is outputted to the post stage via the post-processing unit 83.

After completion of the decoding corresponding to the compression encoding as mentioned above, at the time of the writing into the memory 82 an the extraction from the memory 82 which are necessary to return the order of the frames in the decoded image signal the order of the frames in the original image signal, since the compression and decompression are executed by the signal compressing circuit 91 and signal decompressing circuit 90, the capacity of the memory 82 can be reduced.

The fifth embodiment of the invention mentioned above relates to the case where the invention is applied to, for example, the decoding apparatus for performing the decoding corresponding to the compression encoding which is executed by the first embodiment. Similarly, the fifth embodiment of the invention can be also applied as a decoding apparatus for performing the decoding corresponding to the compression encoding which is executed in each of the second and third embodiments of the invention. Further, the decoding apparatus of the fifth embodiment of the invention can be also applied to, for instance, a decoding apparatus for decoding in correspondence to the compression encoding apparatus for compression encoding a still image in accordance with the rule such as JPEG or the like according to the fourth embodiment or the like of the invention. In this case, the construction for coping with the execution of the motion compensating process is unnecessary.

The present invention is not limited to the foregoing embodiments but many modifications and variations are possible within the spirit and scope of the appended claims of the invention.

As mentioned above, according to the invention, in the compression encoding apparatus and the decoding apparatus which are used in the system for transmitting the image signal or the like of the motion image, still image, or the like in accordance with the rule such as MPEG, JPEG, or the like, the other compression and decompression different from the main compression encoding and decoding which are executed in accordance with each rule are executed. Consequently, the capacity of the memory which is necessary for the processes by the compression encoding apparatus and decoding apparatus can be decreased and the costs of the whole system can be reduced. By adjusting the compression ratio or the like in the other compression and decompression different from the main compression encoding and decoding, the memory capacity can be reduced so as to be adapted to the quality or the like of the image to be transmitted.

As described in the second embodiment of the invention, in case of controlling so that the other compression and decompression different from the main compression encoding and decoding are executed to only the specific portion in the signal, the compression ratio or the like can be set to be high for the specific portion. In this case, the portion where the other compression and decompression different from the main compression encoding and decoding are not performed is the portion in the signal which is subjected to the feedback process, namely, the portion which is referred to as a reference in the main compression encoding and decoding which are carried out to the other portion in the signal. By such a control, the portion that is used as a reference doesn't include the errors which are caused by the other compression and decompression different from the main compression encoding and decoding. Therefore, it is possible to construct in a manner such that even if the compression ratio or the like for the specific portion in the above signal is set to a high value, the quality of the image to be transmitted doesn't deteriorate.

Further, as described in the third embodiment of the invention, in the case where the other compression and decompression different from the main compression encoding and decoding are executed every predetermined unit that is equal to or smaller than the accessing unit in the main compression encoding and decoding, the other compression and decompression different from the main compression encoding and decoding can be executed without deteriorating the accessing efficiency in the main compression encoding and decoding. Therefore, the capacity of the memory provided in association with the compression encoding and decoding apparatuses can be reduced while keeping the inherent accessing efficiency of the system for transmitting the image signal or the like in accordance with the rule of MPEG, JPEG, or the like.

As shown in the fifth embodiment of the invention, on the other hand, even in case of applying the invention to the decoding apparatus on the reception side of the transmission system, the capacity of the memory provided in association with the decoding apparatus can be reduced. That is, the memory capacity which is necessary to return the order of the frames in the decoded image signal to the order of the frames in the original image signal after completion of the decoding corresponding to the compression encoding can be reduced.

Having described specific preferred embodiments of the present invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claimed is:

1. An apparatus for compression encoding an input image signal to produce a compression encoded image signal which adheres to a main compression protocol, the input image signal including one or more image signals, the apparatus comprising:
   a compressing circuit operable to compress at least a portion of the input image signal to produce an initially compressed image signal which adheres to a secondary compression protocol
   a memory operable to store the initially compressed image signal;
   a decompressing circuit in communication with said memory and being operable to decompress the initially compressed image signal to substantially obtain the portion of the input image signal;
   a memory control circuit operable to control the storage and retrieval of the pre-compressed image signal to and from said memory; and
   an encoding circuit operable to encode the input image signal obtained from said decompressing circuit to produce the compression encoded image signal.

2. An apparatus according to claim 1, wherein said encoding circuit comprises:
   a motion detection/motion compensation processing circuit operable to detect motion information of the input image signal and to calculate a difference image signal between an image signal of the input image signal to be encoded and a reference image signal on the basis of the detected motion information; and
   a compression encoding circuit operable to perform compression encoding of the difference image signal to produce the compression encoded image signal.

3. An apparatus according to claim 2, wherein:
   said encoding circuit further includes a local decoding circuit operable to locally decode the compression encoded image signal to produce the reference image signal; and
   said memory control circuit stores the reference image signal in said memory and supplies the reference image signal from said memory to said motion detection/motion compensation processing circuit in order to calculate the difference image signal.

4. An apparatus according to claim 3, wherein said compressing circuit and said decompressing circuit are operable to compress and to decompress only a predetermined one of the image signals of the input image signal.

5. An apparatus according to claim 4, wherein the predetermined image signal is not locally decoded by said local decoding circuit.

6. An apparatus according to claim 5, wherein:
   the main compression protocol is in accordance with the MPEG standard; and
   the predetermined image signal is a B picture as specified by the MPEG standard.

7. An apparatus according to claim 6, wherein said compressing circuit and said decompressing circuit are operable to compress and to decompress said B picture at an efficiency which is higher than those of an I picture and a P picture, the I picture and P picture being specified by the MPEG standard.

8. An apparatus according to claim 1, wherein said compressing circuit and said decompressing circuit are operable to compress and to decompress all portions of the input image signal, respectively.

9. An apparatus according to claim 1, wherein:
   the input image signal includes a luminance signal and a chroma signal; and
   said compressing circuit and said decompressing circuit are operable to compress and to decompress the chroma signal, respectively.

10. An apparatus according to claim 1, wherein:
    each image signal includes information regarding an array of pixels; and
    said compressing circuit and said decompressing circuit are operable to compress and to decompress a given one of the image signals by calculating a difference between a pixel in the given image signal to be encoded and a pixel adjacent to the pixel to be encoded.

11. An apparatus according to claim 1, wherein:
    each image signal includes information regarding an array of pixels;
    said encoding circuit is operable to encode the image signals in predetermined blocks of pixels; and
    said compressing circuit and said decompressing circuit are operable to compress and decompress, respectively, the image signals by calculating a difference between a pixel to be encoded and a pixel adjacent to the pixel to be encoded using a unit that is equal to or smaller than the predetermined blocks.

12. An apparatus for compression decoding an image signal which has been compression encoded to produce a compression encoded image signal adhering to a main compression protocol, the apparatus comprising:
    a decoding circuit operable to decode the compression encoded image signal in accordance with the main compression protocol to obtain the image signal;
    a compressing circuit operable to compress the image signal to produce a secondary compressed image signal which adheres to a secondary compression protocol;
    a memory operable to store the secondary compressed image signal;
    a decompressing circuit operable to decompress the secondary compressed image signal to substantially obtain the image signal; and
    a memory control circuit operable to control the storage and retrieval of the secondary compressed image signal to and from said memory.

13. An apparatus according to claim 12, wherein:
    said compression encoded image signal includes motion vector information; and
    said decoding circuit comprises a decompression decoding circuit operable to decode the compression encoded image signal and obtain at least one of a decoded image signal and a difference image signal; and a forming circuit operable to add the difference image signal and a reference image signal to form the decoded image signal on the basis of the motion vector information.

14. An apparatus according to claim 13, wherein said compressing circuit and said decompressing circuit are operable to compress and decompress, respectively, all portions of the decoded image signal.

15. An apparatus according to claim 12, wherein:
    the decoded image signal includes a luminance signal and a chroma signal; and
    said compressing circuit and said decompressing circuit are operable to compress and decompress the, respectively, chroma signal.

16. An apparatus according to claim 12, wherein:

the image signal includes information regarding arrays of pixels; and said compressing circuit and said decompressing circuit are operable to compress and decompress, respectively, the image signal by calculating a difference between a pixel in the given image signal to be encoded and a pixel adjacent to said pixel to be encoded.

17. A method of compression encoding an input image signal to produce a compression encoded image signal which adheres to a main compression protocol, the input image signal including one or more image signals, the method comprising:

compressing the input image signal to produce an initially compressed image signal which adheres to a secondary compressing protocol;

writing the initially compressed image signal into a memory;

reading the initially compressed image signal from the memory;

decompressing the initially compressed image signal in accordance with the secondary compression protocol to substantially obtain the input image signal; and encoding the input image signal in accordance with the main compression protocol to obtain the compression encoded version of the input image signal.

18. A method according to claim 17, wherein encoding the input image signal further comprises:

detecting motion information of the input image signal;

calculating a difference image signal between an image signal of the input image signal to be encoded and a reference image signal on the basis of the detected motion information; and compression encoding the difference image signal to produce the compression encoded image signal.

19. A method according to claim 18, wherein compression encoding the difference image signal includes:

locally decoding the compression encoded image signal to produce the reference image signal; and writing the reference image signal into said memory; and the step of detecting motion information includes reading out the reference image signal from said memory and calculating the difference image signal using the reference image signal.

20. A method according to claim 19, wherein compressing the input image signal is applied to all the image signals of the input image signal.

21. A method according to claim 19, wherein compressing the input image signal is applied to only a predetermined one of the image signals of the input image signal.

22. A method according to claim 21, wherein the predetermined image signal is not locally decoded.

23. A method according to claim 22, wherein:

the main compression protocol is in accordance with the MPEG standard; and the predetermined image signal is a B picture as specified by the MPEG standard.

24. A method according to claim 23, wherein compressing said B picture is achieved at an efficiency which is higher than those of an I picture and a P picture, the I picture and P picture being specified by the MPEG standard.

25. A method according to claim 17, wherein:

the input image signal includes a luminance signal and a chroma signal, and compressing the input image signal is executed on the chroma signal.

26. A method according to claim 17, wherein:

each image signal includes information regarding an array of pixels; and the step of compressing a given one of the image signals includes calculating a difference between a pixel in the given image signal to be encoded and a pixel adjacent to the pixel to be encoded.

27. A method according to claim 17, wherein:

each image signal includes information regarding an array of pixels;

encoding the input image signal is applied on predetermined blocks of pixels; and the image signals are compressed by calculating a difference between a pixel in the given image signal to be encoded and a pixel adjacent to the pixel to be encoded using a unit that is equal to or smaller than the predetermined blocks.

28. A method of decoding an image signal which has been compression encoded to produce a compression encoded image signal which adheres to a main compression protocol, the method comprising:

decoding the compression encoded image signal in accordance with the main compression protocol to obtain the image signal;

compressing the image signal in accordance with a secondary compression protocol to produce a secondary compressed image signal;

writing the secondary compressed image signal into a memory;

reading out the secondary compressed image signal stored in said memory; and decompressing the secondary compressed image signal to substantially obtain the image signal.

29. A method according to claim 28, wherein:

the compression encoded image signal includes motion vector information; and the step of decoding the compression encoded image signal comprises obtaining a least one of a decoded image signal and a difference image signal from the compression encoded image signal; and adding the difference image signal and a reference image signal to form the decoded image signal on the basis of the motion vector information.

30. A method according to claim 29, wherein compressing the image signal is applied to all image signals of the decoded image signal.

31. A method according to claim 28, wherein:

the image signal includes a luminance signal and a chroma signal; and compressing the image signal is applied to the chroma signal.

32. A method according to claim 28, wherein:

the image signal includes information regarding one or more arrays of pixels; and the step of compressing the image signal includes calculating a difference between a pixel in the given image signal to be encoded and a pixel adjacent to the pixel to be encoded.

* * * * *

UNITED STATES PATENT AND TRADEMARK OFFICE
CERTIFICATE OF CORRECTION

PATENT NO. : 6,097,843
DATED : Aug. 1, 2000
INVENTOR(S) : Takashima et al.

It is certified that error appears in the above-identified patent and that said Letters Patent is hereby corrected as shown below:

Col. 1, line 45, "refines" should read --defined--.

Col. 2, line 53, delete "(".

Col. 3, line 61, after "signal" insert --by--.

Col. 3, line 62, "stores" should read --stored--.

Col. 4, line 23, "an" should read --and--.

Col. 5, line 1, delete "1".

Col. 6, line 59, after "interface" insert --7--.

Col. 9, line 30, "he" should read --the--.

Col. 14, line 9, "The" should read --the--.

Col. 20, line 44, after "comprises" insert --:--

Signed and Sealed this

Seventeenth Day of April, 2001

Attest:

NICHOLAS P. GODICI

*Attesting Officer*     *Acting Director of the United States Patent and Trademark Office*